United States Patent
Tan

(10) Patent No.: US 11,499,560 B1
(45) Date of Patent: Nov. 15, 2022

(54) FAN SYSTEM AND MONITORING METHOD FOR FAN SYSTEM

(71) Applicant: Midastek Microelectronics Inc., Taipei (TW)

(72) Inventor: Chung-Ping Tan, Taipei (TW)

(73) Assignee: Midastek Microelectronics Inc., Taipei (TW)

( * ) Notice: Subject to any disclaimer, the term of this patent is extended or adjusted under 35 U.S.C. 154(b) by 0 days.

(21) Appl. No.: 17/580,594

(22) Filed: Jan. 20, 2022

(30) Foreign Application Priority Data

Dec. 15, 2021 (TW) .................................. 110146848

(51) Int. Cl.
| F04D 27/02 | (2006.01) |
| F04D 27/00 | (2006.01) |
| G05B 19/042 | (2006.01) |
| G05B 19/048 | (2006.01) |

(52) U.S. Cl.
CPC ......... F04D 27/001 (2013.01); G05B 19/048 (2013.01); G05B 19/0428 (2013.01)

(58) Field of Classification Search
None
See application file for complete search history.

(56) References Cited

U.S. PATENT DOCUMENTS

| 11,093,264 | B1* | 8/2021 | Korobov | G06F 9/452 |
| 2014/0022849 | A1* | 1/2014 | Krutzik | G11C 16/22 |
| | | | | 365/185.33 |
| 2018/0314745 | A1* | 11/2018 | Filippi | G06F 16/164 |
| 2019/0163842 | A1* | 5/2019 | Pal | G06F 16/252 |
| 2019/0317947 | A1* | 10/2019 | Xu | G06F 11/32 |
| 2020/0133257 | A1* | 4/2020 | Cella | G06N 3/0454 |
| 2021/0158074 | A1* | 5/2021 | Wray | G06F 16/90335 |
| 2021/0358785 | A1* | 11/2021 | Merton | G06N 3/08 |

* cited by examiner

Primary Examiner — Michael Lebentritt
(74) Attorney, Agent, or Firm — JCIPRNET

(57) ABSTRACT

A fan system and a monitoring method are provided. The fan system includes a fan device and a controller. The fan device includes a fan unit, a detector, and a memory. The detector detects an operating state of the fan unit during operation to obtain operating raw data corresponding to the operating state. The memory records the operating raw data and stores a data protocol. The controller provides a monitoring request to allow the memory to provide the operating raw data and a data protocol to the controller, converts the operating raw data into operating state data through the data protocol, and provides an early warning notification signal according to the operating state data. When the operating raw data is provided to the controller, the operating raw data stored in the memory is erased.

15 Claims, 5 Drawing Sheets

FAN SYSTEM AND MONITORING METHOD FOR FAN SYSTEM

CROSS-REFERENCE TO RELATED APPLICATION

This application claims the priority benefit of Taiwan application serial no. 110146848, filed on Dec. 15, 2021. The entirety of the above-mentioned patent application is hereby incorporated by reference herein and made a part of this specification.

BACKGROUND

Technical Field

The disclosure relates to a fan system and a monitoring method for the fan system, and in particular, relates to a fan system and a monitoring method capable of providing an early warning notification according to an operating state of a fan.

Description of Related Art

Fans are used in most apparatuses (e.g., production equipment, personal computers, notebook computers, etc.) for cooling. An apparatus may run smoothly thanks to the cooling effect provided by the fan. However, fans are often regarded as components exhibiting low reliability. If the fan is abnormal or fails, it will cause the apparatus to overheat and stop or be damaged. Therefore, the fan needs to be replaced or repaired before an abnormality or failure occurs. It thus can be seen that how to construct a fan monitoring technology capable of providing an early warning notification based on the operating state of a fan is one of the research and development focuses for a person having ordinary skill in the art.

SUMMARY

The disclosure provides a fan system and a monitoring method for the fan system capable of providing an early warning notification according to an operating state of a fan.

The disclosure provides a fan system including a fan device and a controller. The fan device includes a fan unit, a detector, and a memory. The detector detects an operating state of the fan unit during operation to obtain operating raw data corresponding to the operating state. The memory is coupled to the detector. The memory is operated to record the operating raw data and stores a data protocol. The controller provides a monitoring request to allow the memory to provide the operating raw data and the data protocol to the controller in response to the monitoring request and converts, through the data protocol, the operating raw data into operating state data. The controller provides an early warning notification signal according to the operating state data. When the operating raw data is provided to the controller, the operating raw data stored in the memory is erased.

The disclosure further provides a monitoring method suitable for a fan system. The fan system includes a fan device and a controller. The fan device includes a fan unit and a memory. The monitoring method includes the following steps. The fan unit is driven, and an operating state of the fan unit during operation is detected to obtain operating raw data corresponding to the operating state. The operating raw data is stored into the memory. A monitoring request is provided through the controller to allow the memory to provide the operating raw data and a data protocol to the controller in response to the monitoring request, and the operating raw data is converted into operating state data through the data protocol. When the operating raw data is provided to the controller, the operating raw data stored in the memory is erased. An early warning notification signal is provided through the controller according to the operating state data.

To sum up, in the fan system and the monitoring method provided by the disclosure, the controller provides the monitoring request to receive the operating raw data and the data protocol through the memory and converts the operating raw data into the operating state data through the data protocol. Therefore, the controller may provide the early warning notification signal. In addition, when the operating raw data is provided to the controller, the operating raw data stored in the memory is erased. In this way, the memory space requirement of the memory in the fan system may be significantly reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
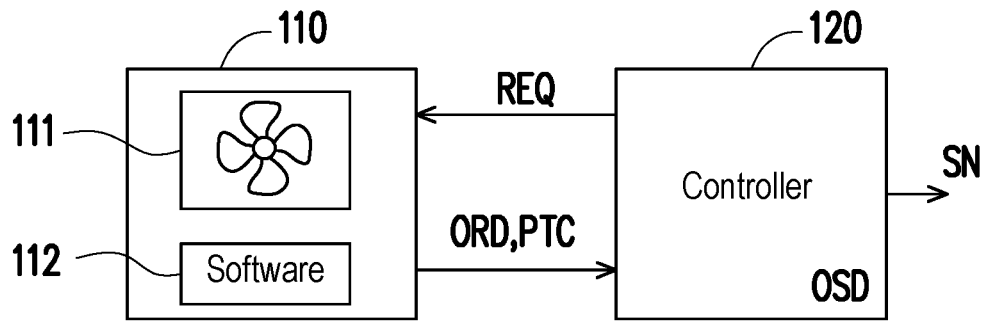
FIG. 1 is a schematic diagram illustrating a fan system according to a first embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, these embodiments are only examples in the scope of the patent application of the disclosure.

With reference to FIG. 1, FIG. 1 is a schematic diagram illustrating a fan system according to a first embodiment of the disclosure. In this embodiment, the fan system 100 includes a fan device 110 and a controller 120. The fan device 110 includes a fan unit 111 and software 112. The fan unit 111 may be, for example, a cooling element that uses a motor to drive fan blades to achieve a cooling effect. The fan device 110 may communicate with the controller 120 through the software 112. To be specific, the software 112 may record operating raw data ORD of the fan device 110 during operation. The operating raw data ORD includes, for example, at least one of a driving current value, a driving voltage value, an ambient temperature value, and an operating time length of the fan device 110 during operation. The controller 120 may be, for example, an electronic device having a computing function. The controller 120 and the fan device 110 may communicate to each other by a wired communication method or a wireless communication method known to a person having ordinary skill in the art. The controller 120 provides a monitoring request REQ to the fan device 110. In this embodiment, the software 112 provides the operating raw data ORD and a data protocol PTC to the controller 120 in response to the monitoring request REQ. The data protocol PTC is used to indicate a coding rule or a format type of the operating raw data ORD. The controller 120 converts the operating raw data ORD into operating state data OSD through the data protocol PTC. In this embodiment, the controller 120 further provides an early warning notification signal SN according to the operating state data OSD. The early warning notification signal SN may be at least one of an audio signal, an optical signal, and a text signal. Based on the determination of the operating state data OSD, the controller 120 may provide the early warning notification signal SN before an abnormality or failure occurs. In this way, a user (or a managing person or a maintainer) may repair or replace the fan device 110 according to the early warning notification signal SN. In this embodiment, the fan device 110 may use a plurality of physical elements to implement the abovementioned operations of the software 112.

In this embodiment, the controller 120 may periodically provide the monitoring request REQ. In some embodiments, the controller 120 provides the monitoring request REQ based on an external operation or an external command.

Further, in this embodiment, a format of the operating raw data ORD is a first data format suitable for the fan device 110. A format of the operating state data OSD is a second data format that the controller 120 can recognize. The controller 120 may convert the operating raw data ORD in the first data format into the operating state data OSD that the controller 120 can recognize through the data protocol PTC. That is, the data format of the fan device 110 in the fan system 100 may be different from the data format of the controller 120. In this way, the fan system 100 is not limited to the fan device 110 and the controller 120 having the same data format.

In some embodiments, the fan system 100 may include a plurality of fan devices, and the number of fan devices of the disclosure is not limited to this embodiment. In some embodiments, the data formats of the plurality of fan devices may not be completely the same. For example, the plurality of fan devices include a first fan device and a second fan device. The data format of the first fan device is different from the data format of the second fan device. The controller 120 may convert a first operating raw data of the first fan device into a first operating state data that the controller 120 can recognize according to a first data protocol of the first fan device. The controller 120 may convert a second operating raw data of the second fan device into a second operating state data that the controller 120 can recognize according to a second data protocol of the second fan device.

Figure 2:
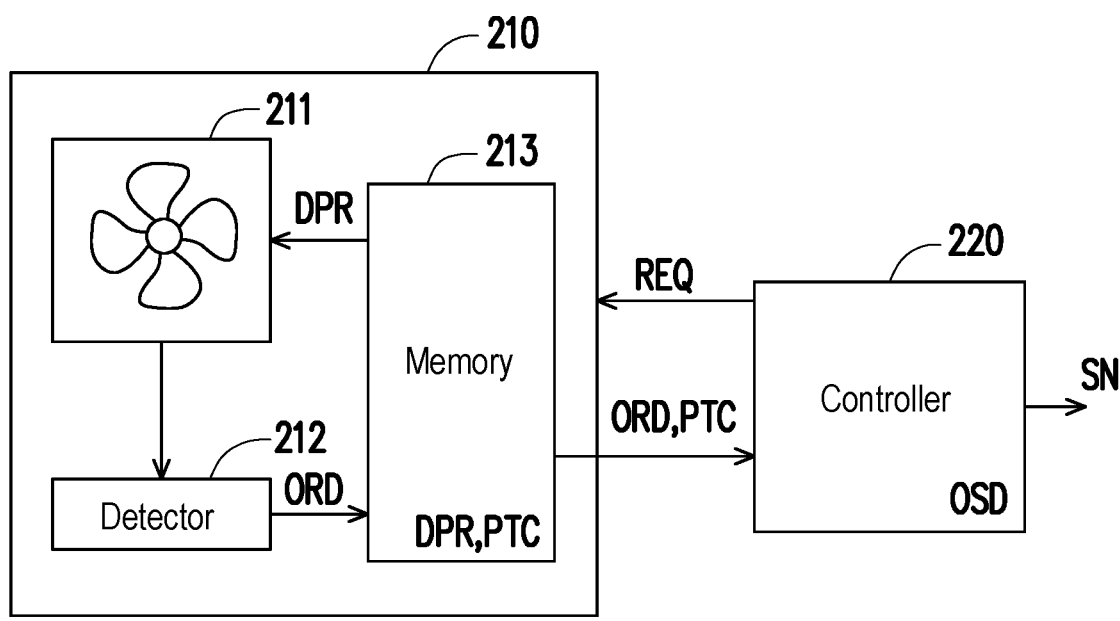
FIG. 2 is a schematic diagram illustrating a fan system according to a second embodiment of the disclosure.
Figure 3:
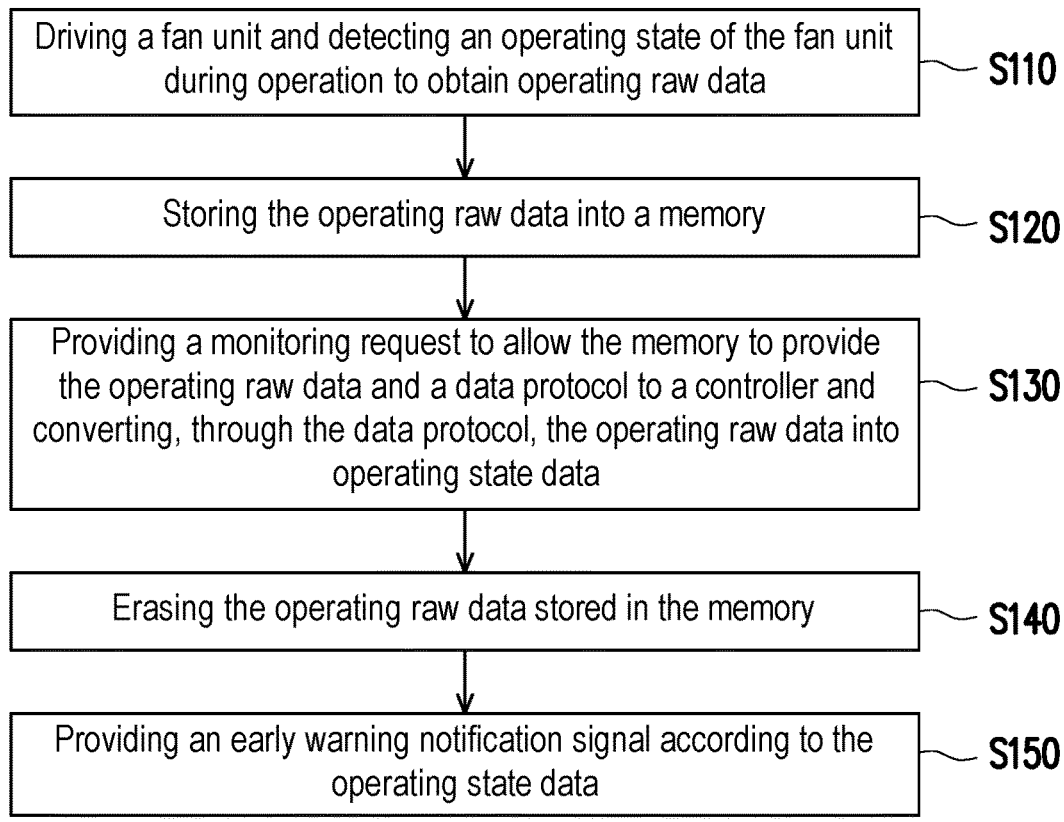
FIG. 3 is a flow chart illustrating a monitoring method according to the second embodiment.

With reference to FIG. 2 and FIG. 3 together, FIG. 2 is a schematic diagram illustrating a fan system according to a second embodiment of the disclosure. FIG. 3 is a flow chart illustrating a monitoring method according to the second embodiment. In this embodiment, a fan system 200 includes a fan device 210 and a controller 220. The fan device 210 includes a fan unit 211, a detector 212, and a memory 213. The memory 213 is coupled to the fan unit 211 and the detector 212. In step S110, the fan unit 211 operates in response to a driving parameter DPR. The detector 212 detects an operating state of the fan unit 211 during operation to obtain the operating raw data ORD corresponding to the operating state. In this embodiment, the memory 213 stores the driving parameter DPR, and the fan unit 211 may receive the driving parameter DPR through the memory 213 and operate in response to the driving parameter DPR to generate a cooling effect. In this embodiment, the operating raw data ORD includes, for example, at least one of a driving current value configured for driving the fan unit 211, a driving voltage value configured for driving the fan unit 211, an ambient temperature value, and an operating time length. Therefore, the detector 212 includes, for example, at least one of a current sensor, a voltage sensor, a temperature sensor, and a timer. The memory 213 may be a data storage element of any form.

In step S120, the operating raw data ORD is stored into the memory 213. That is, the memory 213 is operated to record the operating raw data ORD.

In this embodiment, the memory 213 also stores the data protocol PTC. In step S130, the controller 220 provides the monitoring request REQ to the fan device 210. The memory 213 provides the operating raw data ORD and the data protocol PTC to the controller 120 in response to the monitoring request REQ. The controller 220 converts the operating raw data ORD into the operating state data OSD through the data protocol PTC. The detailed implementation of the controller 220 converting the operating raw data ORD into the operating state data OSD may be sufficiently taught by the embodiment of FIG. 1, so description thereof is not repeated herein.

Next, in step S140, the operating raw data ORD stored in the memory 213 is erased. That is, when the operating raw data ORD is provided to the controller 220, the operating raw data ORD stored in the memory 213 is erased. For instance, when the controller 220 receives the data protocol PTC and the complete operating raw data ORD, the operating raw data ORD stored in the memory 213 may be erased by the controller 220. For another instance, the fan device 210 may erase the operating raw data ORD stored in the memory 213. In this embodiment, the detector 212 and the memory 213 may implement the operation of the software 112 as shown in FIG. 1.

Note that the controller 220 may periodically provide the monitoring request REQ. Therefore, the controller 220 may provide the monitoring request REQ based on a predetermined period (e.g., 1 to 5 minutes, which is not limited by the disclosure). Therefore, in step S140, the operating raw data ORD stored in the memory 213 may be erased based on the predetermined period. It thus can be seen that the memory space of the memory 213 is required to accommodate the data protocol PTC, the driving parameter DPR, and the operating raw data ORD of a single predetermined period only. In this way, the memory space requirement of the memory 213 may be significantly reduced.

In step S150, the controller 220 provides the early warning notification signal SN according to the operating state data OSD. For instance, the controller 220 records a predetermined value (e.g., predetermined current value). The predetermined value is lower than the driving current value when the fan unit 211 is abnormal or fails. Therefore, once the driving current value in the operating state data OSD is determined to be greater than the predetermined value, the controller 220 provides and issues the corresponding early warning notification signal SN. In this way, based on the determination of the operating state data OSD, the controller 220 may provide the early warning notification signal SN before the fan unit 211 is abnormal or fails, so that the user may repair, maintain, or replace the fan device 110 according to the early warning notification signal SN.

Figure 4:
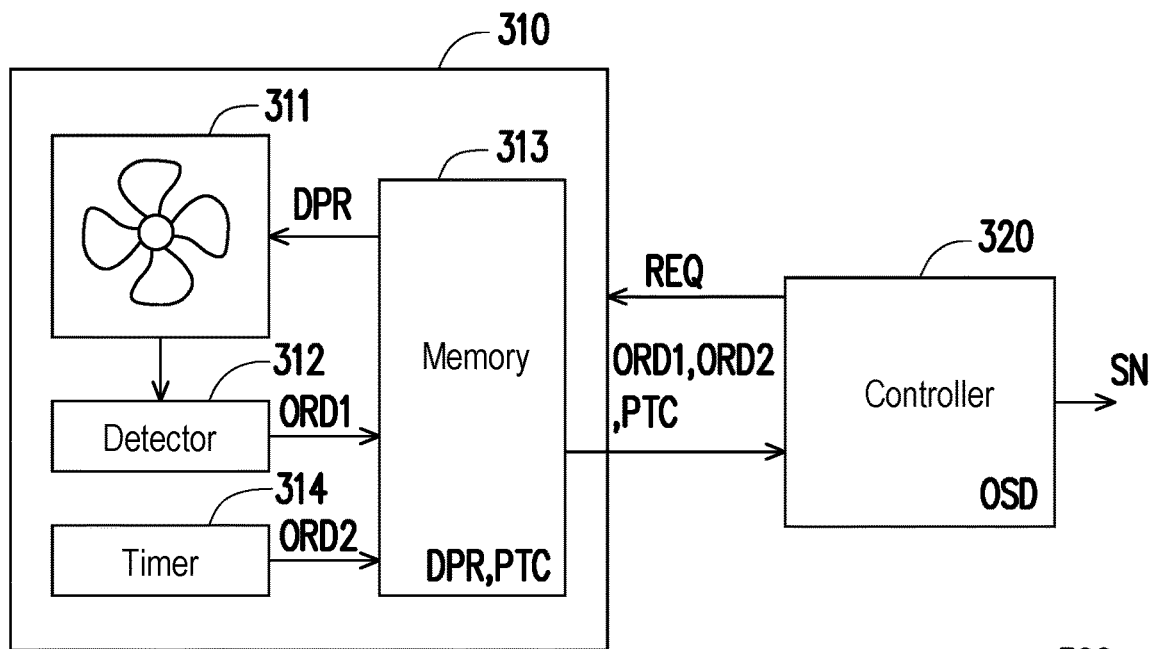
FIG. 4 is a schematic diagram illustrating a fan system according to a third embodiment of the disclosure.
Figure 5:
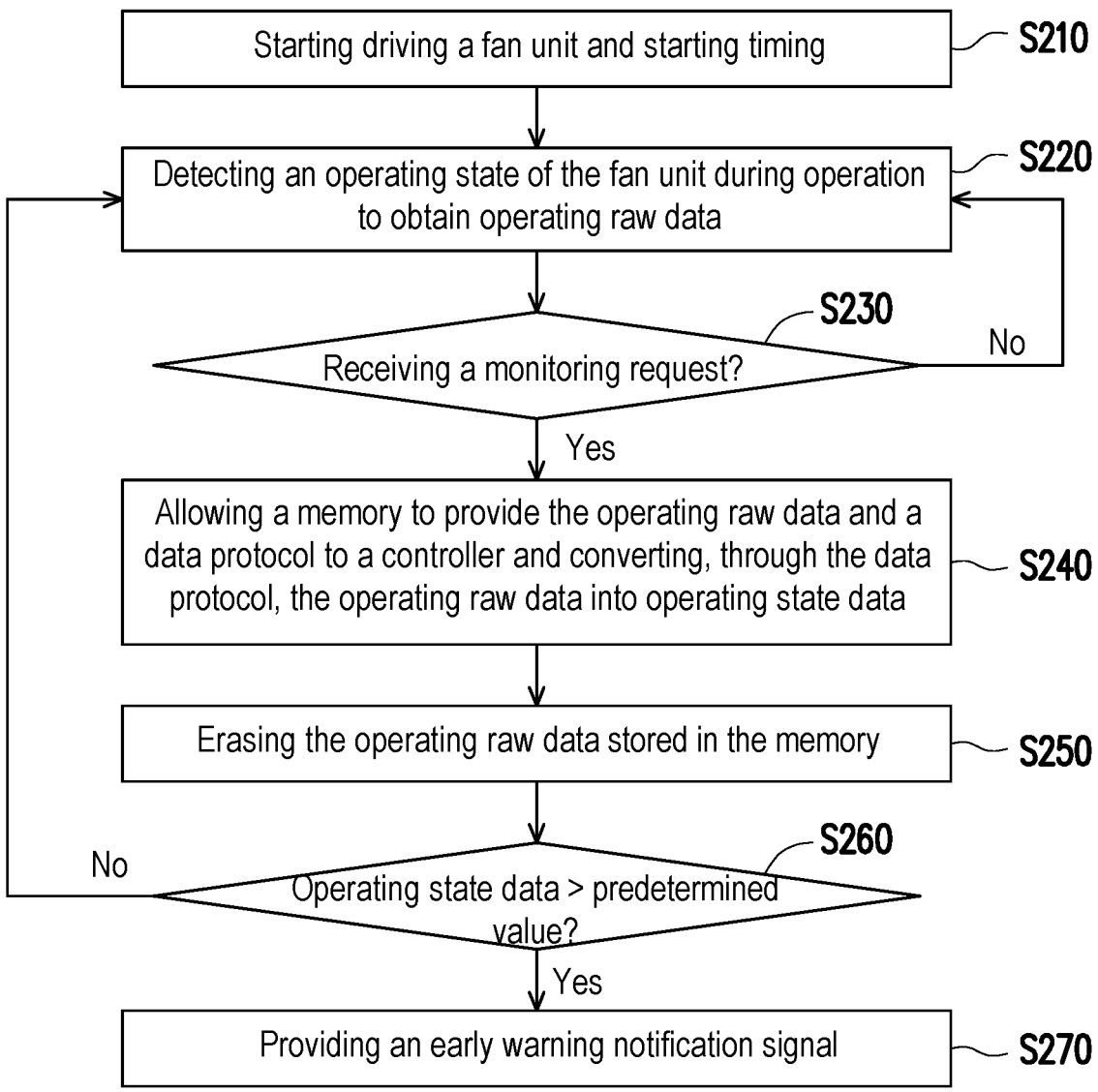
FIG. 5 is a flow chart illustrating a monitoring method according to the third embodiment.

With reference to FIG. 4 and FIG. 5 together, FIG. 4 is a schematic diagram illustrating a fan system according to a third embodiment of the disclosure. FIG. 5 is a flow chart illustrating a monitoring method according to the third embodiment. In this embodiment, a fan system 300 includes a fan device 310 and a controller 320. The fan device 310 includes a fan unit 311, a detector 312, a memory 313, and a timer 314. The memory 313 is coupled to the fan unit 311, the detector 312, and the memory 313. In step S210, the fan unit 311 starts to be driven. In addition, the timer 314 starts timing. In this embodiment, while the fan unit 311 is operating, the timer 314 may continuously time the operating time of the fan unit 311. In this embodiment, the timer 314 continuously time the operating time of the fan unit 311 to provide operating raw data ORD2 corresponding to the operating time length. In this embodiment, the detector 312, the memory 313, and the timer 314 may implement the operation of the software 112 as shown in FIG. 1.

In step S220, the detector 312 detects an operating state of the fan unit 311 during operation to obtain operating raw data ORD 1 corresponding to the operating state. The operating raw data ORD1 includes, for example, at least one of a driving current value, a driving voltage value, and an ambient temperature value.

In step S230, the fan device 310 determines whether the monitoring request REQ is received. When the monitoring request REQ is not received, the fan device 310 may perform the operation of step S220 to continuously obtain the operating raw data ORD1 and ORD2. In contrast, when the monitoring request REQ is received, the fan device 310 may allow the memory 313 to provide the operating raw data ORD1 and ORD2 and the data protocol PTC to the controller 320 in step S240. In addition, the controller 320 converts the operating raw data ORD1 and ORD2 into the operating state data OSD through the data protocol PTC in step S240.

In step S250, the operating raw data ORD1 and ORD2 stored in the memory 313 is erased.

In step S260, the controller 320 determines whether the operating state data OSD is greater than the predetermined value. When the operating state data OSD is greater than the predetermined value, the controller 320 may provide the early warning notification signal SN in step S270. In contrast, when the operating state data OSD is less than or equal to the predetermined value, the fan device 310 may perform the operation of step S220 to continuously obtain the operating raw data ORD1 and ORD2.

In this embodiment, based on design needs, when the early warning notification signal SN is provided, the fan device 310 may continuously obtain the operating raw data ORD1 and ORD2 or stop obtaining the operating raw data ORD1 and ORD2.

Figure 6:
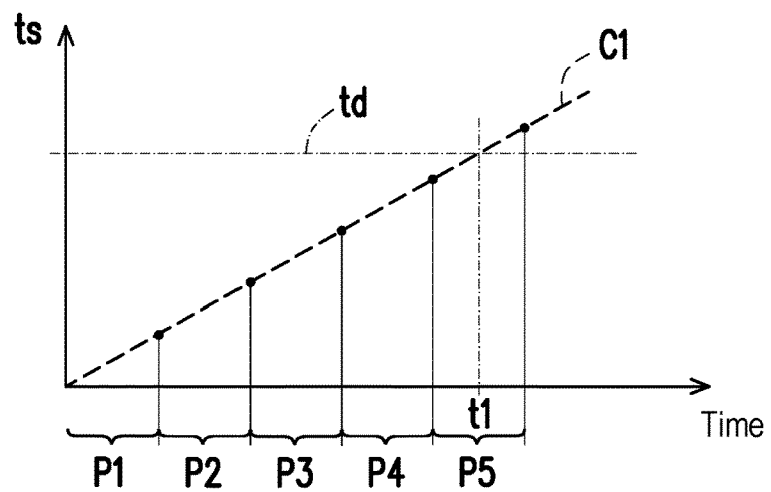
FIG. 6 is a wave chart illustrating operating state data according to an embodiment of the disclosure.

Further examples are given to illustrate the implementation details of determination of the operating state data. With reference to FIG. 4 and FIG. 6 together, FIG. 6 is a wave chart illustrating operating state data according to an embodiment of the disclosure. In this embodiment, the operating state data OSD includes a total operating time length ts of the fan unit 311. In this embodiment, the total operating time length ts is associated with the operating raw data ORD2 provided by the timer 314. The operating raw data ORD2 is shown in curve C1. In this embodiment, the controller 321 determines whether the total operating time length ts is greater than a predetermined time length td. When the total operating time length ts is greater than the predetermined time length td, the controller 320 provides the early warning notification signal SN. In this embodiment, the early warning notification signal SN is a notification signal corresponding to the total operating time length ts being greater than the predetermined time length td.

In this embodiment, the predetermined time length td is set to be less than a time length of an expected lifetime of the fan unit 311 or is set to be equal to a maintenance period.

In this embodiment, the controller 320 may provide the monitoring request REQ based on the predetermined period (e.g., 1 to 5 minutes, which is not limited by the disclosure). Therefore, the controller 320 may, at a plurality of time points after periods P1 to P5, receive a plurality of total operating time lengths ts corresponding to the time points. That is, the total operating time lengths ts at the time points are roughly the sampling results of the curve C1. In this embodiment, the total operating time lengths ts received at the time points after the periods P1 to P4 are determined to be less than the predetermined time length td. Therefore, the controller 320 may not provide the early warning notification signal SN. In contrast, the total operating time length ts received at the time point after the period P5 is greater than the predetermined time length td. This indicates that the total operating time length ts of the fan unit 311 is about to reach the time length of the expected lifetime, or maintenance is required. Therefore, the controller 320 provides the early warning notification signal SN at the time point after the period P5.

In some embodiments, the controller 320 may learn that the total operating time length ts may be equal to the predetermined time length td at a time point t1 according to the total operating time lengths ts received at the time points after the periods P1 to P4. Therefore, the controller 320 may provide the early warning notification signal SN at the time point t1.

Figure 7:
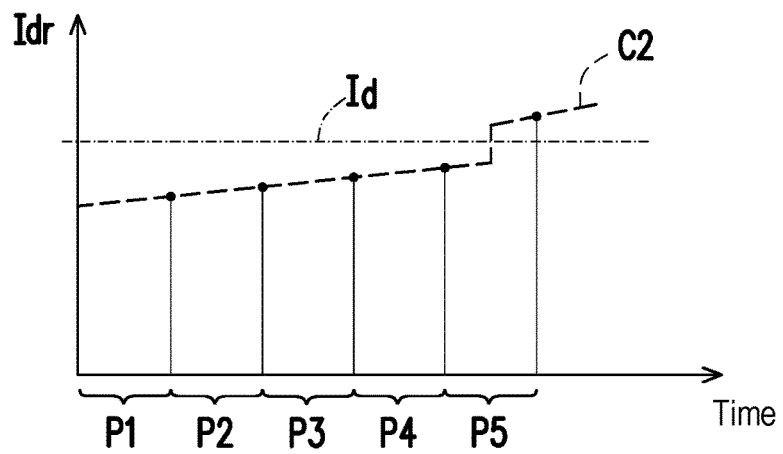
FIG. 7 is a wave chart illustrating the operating state data according to another embodiment of the disclosure.

With reference to FIG. 4 and FIG. 7 together, FIG. 7 is a wave chart illustrating the operating state data according to another embodiment of the disclosure. In this embodiment, the operating state data OSD includes a driving current value Idr configured for driving the fan unit 311. In this embodiment, the driving current value Idr is associated with the operating raw data ORD1 provided by the timer 314. The operating raw data ORD1 is shown in curve C2. In this embodiment, the controller 320 determines whether the driving current value Idr is greater than a predetermined current value Id. When the driving current value Idr is greater than the predetermined current value Id, the controller 320 provides the early warning notification signal SN. In this embodiment, the early warning notification signal SN is a notification signal corresponding to the driving current value Idr being greater than the predetermined current value Id.

In this embodiment, the predetermined current value Id is set to be less than a limit current value. The limit current value is a current value that may cause damage to the fan unit 311.

In this embodiment, the controller 320 may provide the monitoring request REQ based on the predetermined period.

Therefore, the controller 320 may, at the time points after the periods P1 to P5, receive a plurality of driving current values Idr corresponding to the time points. That is, the driving current values Idr at the time points are roughly the sampling results of the curve C2. In this embodiment, the driving current values Idr received at the time points after the periods P1 to P4 are determined to be less than the predetermined current value Id. Therefore, the controller 320 may not provide the early warning notification signal SN. In contrast, the driving current value Idr received at the time point after the period P5 is greater than the predetermined current value Id. This indicates that the driving current value Idr is abnormal. Therefore, the controller 320 provides the early warning notification signal SN at the time point after the period P5.

Figure 8:
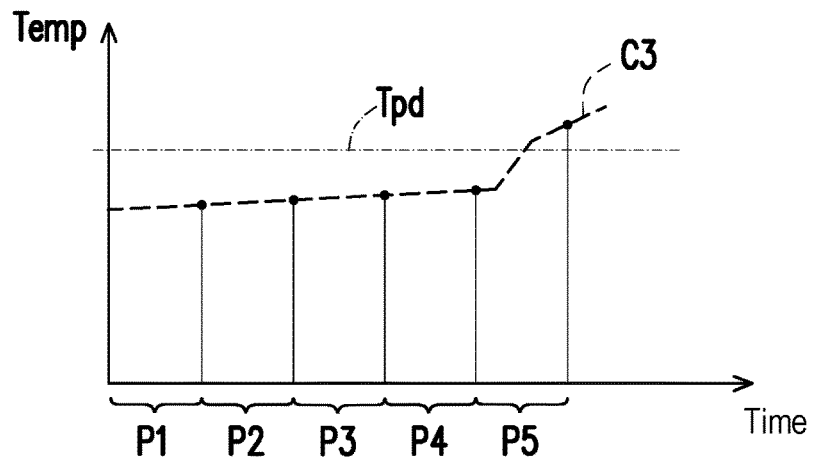
FIG. 8 is a wave chart illustrating the operating state data according to still another embodiment of the disclosure.

With reference to FIG. 4 and FIG. 8 together, FIG. 8 is a wave chart illustrating the operating state data according to still another embodiment of the disclosure. In this embodiment, the operating state data OSD includes an ambient temperature value Temp. In this embodiment, the ambient temperature value Temp is associated with the operating raw data ORD1 provided by the timer 314. The operating raw data ORD1 is shown in curve C3. In this embodiment, the controller 320 determines whether the ambient temperature value Temp is greater than a predetermined temperature value Tpd. When the ambient temperature value Temp is greater than the predetermined temperature value Tpd, the controller 320 provides the early warning notification signal SN. In this embodiment, the early warning notification signal SN is a notification signal corresponding to the ambient temperature value Temp being greater than the predetermined temperature value Tpd.

In this embodiment, the predetermined temperature value Tpd is set to be less than a limit temperature value. The limit temperature value is a temperature value that may cause damage to the fan unit 311, or a temperature value that may cause damage to the device.

In this embodiment, the controller 320 may provide the monitoring request REQ based on the predetermined period. Therefore, the controller 320 may, at the time points after the periods P1 to P5, receive a plurality of ambient temperature values Temp corresponding to the time points. That is, the ambient temperature values Temp at the time points are roughly the sampling results of the curve C2. In this embodiment, the ambient temperature values Temp received at the time points after the periods P1 to P4 are determined to be less than the predetermined temperature value Tpd. Therefore, the controller 320 may not provide the early warning notification signal SN. In contrast, the ambient temperature value Temp received at the time point after the period P5 is greater than the predetermined temperature value Tpd. This indicates that the cooling capacity of the fan unit 311 may be insufficient or fail. Therefore, the controller 320 provides the early warning notification signal SN at the time point after the period P5.

With reference to the embodiments of FIG. 4 and FIG. 5 again, the operating state data OSD includes at least two of a driving current value (e.g., the driving current value Idr shown in FIG. 7), a driving voltage value, an ambient temperature value (e.g., the ambient temperature value Temp shown in FIG. 8), and a total operating time length (e.g., the total operating time length is shown in FIG. 6). Therefore, the controller 320 performs determination on at least two of the driving current value, the driving voltage value, the ambient temperature value, and the total operating time length to obtain determination results and provides the corresponding early warning notification signal SN according to the determination results.

Figure 9:
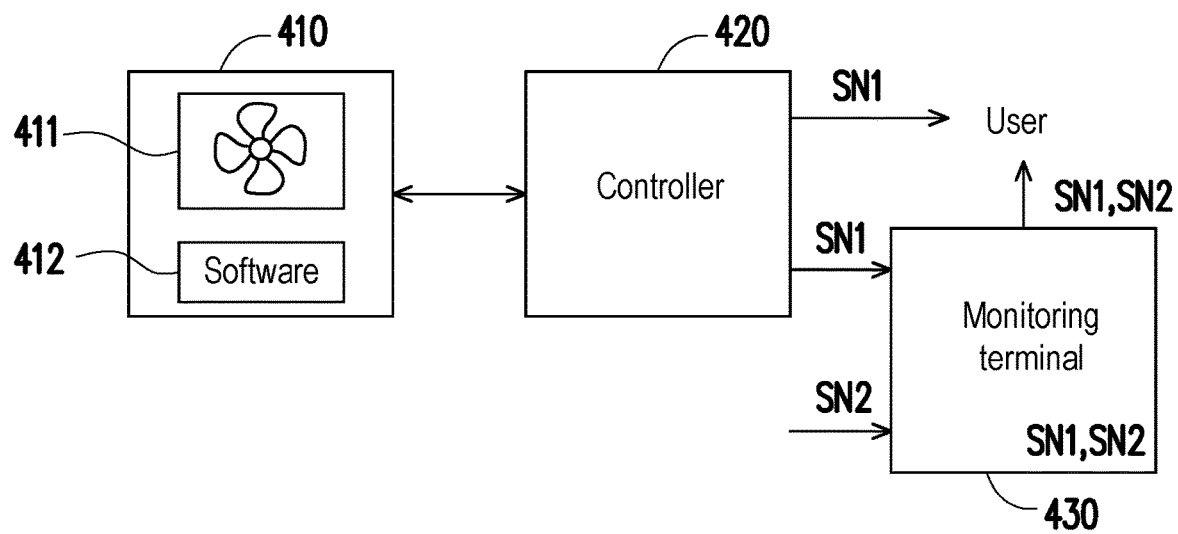
FIG. 9 is a schematic diagram illustrating a fan system according to a fourth embodiment of the disclosure.

With reference to FIG. 9, FIG. 9 is a schematic diagram illustrating a fan system according to a fourth embodiment of the disclosure. In this embodiment, a fan system 400 includes a fan device 410, a controller 420, and a monitoring terminal 430. The fan device 410 includes a fan unit 411 and software 412. The monitoring terminal 430 and the controller 420 may communicate to each other by a wired communication method or a wireless communication method known to a person having ordinary skill in the art. The cooperative operation of the fan device 410 and the controller 420 of this embodiment may be sufficiently taught by the embodiments of FIG. 1 to FIG. 8, so description thereof is not repeated herein. In this embodiment, the monitoring terminal 430 collects an early warning notification signal SN1 through the controller 420 and issues the early warning notification signal SN1. The user may repair or maintain the fan device 410 according to the early warning notification signal SN1 issued by the controller 420 or the monitoring terminal 430. Besides, the monitoring terminal 430 collects an early warning notification signal SN2 from another controller (not shown) and issues the early warning notification signal SN2. Therefore, the monitoring terminal 430 may issue the early warning notification signals SN1 and SN2. In this embodiment, the monitoring terminal 430 may be a device such as a background host or a server.

In some embodiments, based on design needs, the fan system 400 may include a plurality of fan devices and a plurality of controllers, but it is not limited to this embodiment.

In view of the foregoing, in the fan system and the monitoring method provided by the disclosure, the controller provides the monitoring request to receive the operating raw data and the data protocol through the memory and converts the operating raw data into the operating state data through the data protocol. In this way, the controller may provide the early warning notification signal before an abnormality or failure occurs, so that the user may repair or replace the fan device according to the early warning notification signal. The data format of the fan device may be different from the data format of the controller. In this way, based on the data protocol, the fan system is not limited to the fan device and the controller having the same data format. Further, when the operating raw data is provided to the controller, the operating raw data stored in the memory is erased. In this way, the memory space requirement of the memory in the fan system may be significantly reduced. In some examples, the fan system further includes the monitoring terminal. The user may repair or maintain the fan device according to the early warning notification signal issued by the controller or the monitoring terminal.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A fan system, comprising:
 a fan device, comprising:
  a fan unit;
  a detector, configured for detecting an operating state of the fan unit during operation to obtain operating raw data corresponding to the operating state; and a memory, coupled to the detector, operated to record the operating raw data and store a data protocol; and a controller, configured for providing a monitoring request to allow the memory to provide the operating raw data and the data protocol to the controller in response to the monitoring request, converting the operating raw data into operating state data through the data protocol, and providing an early warning notification signal according to the operating state data, wherein the operating raw data stored in the memory is erased when the operating raw data is provided to the controller.

2. The fan system according to claim 1, wherein a format of the operating raw data is a data format suitable for the fan device, and a format of the operating state data is a data format that the controller recognizes.

3. The fan system according to claim 1, wherein the controller is further configured for:

providing the early warning notification signal when the operating state data is determined to be greater than a predetermined value.

4. The fan system according to claim 1, wherein the operating state data comprises a total operating time length of the fan unit, and the controller is further configured for:

determining whether the total operating time length is greater than a predetermined time length; and providing the early warning notification signal corresponding to the total operating time length being greater than the predetermined time length when the total operating time length is greater than the predetermined time length.

5. The fan system according to claim 1, wherein the operating state data comprises a driving current value configured for driving the fan unit, and the controller is further configured for:

determining whether the driving current value is greater than a predetermined current value; and providing the early warning notification signal corresponding to the driving current value being greater than the predetermined current value when the driving current value is greater than the predetermined current value.

6. The fan system according to claim 1, wherein the operating state data comprises an ambient temperature value, and the controller is further configured for:

determining whether the ambient temperature value is greater than a predetermined temperature value; and providing the early warning notification signal corresponding to the ambient temperature value being greater than the predetermined temperature value when the ambient temperature value is greater than the predetermined temperature value.

7. The fan system according to claim 1, wherein the fan device further comprises:

a timer, configured for timing an operating time of the fan unit.

8. The fan system according to claim 1, further comprising:

a monitoring terminal, configured for collecting the early warning notification signal through the controller and issuing the early warning notification signal.

9. A monitoring method for a fan system, wherein the fan system comprises a fan device and a controller, wherein the fan device comprises a fan unit and a memory, and the monitoring method comprises:

driving the fan unit and detecting an operating state of the fan unit during operation to obtain operating raw data corresponding to the operating state;

storing the operating raw data into the memory;

providing, through the controller, a monitoring request to allow the memory to provide the operating raw data and a data protocol to the controller in response to the monitoring request and converting, through the data protocol, the operating raw data into operating state data;

erasing the operating raw data stored in the memory when the operating raw data is provided to the controller; and providing, through the controller, an early warning notification signal according to the operating state data.

10. The monitoring method according to claim 9, wherein a format of the operating raw data is a data format suitable for the fan device, and a format of the operating state data is a data format that the controller recognizes.

11. The monitoring method according to claim 9, wherein the step of providing, through the controller, the early warning notification signal according to the operating state data further comprises:

providing, through the controller, the early warning notification signal when the operating state data is determined to be greater than a predetermined value.

12. The monitoring method according to claim 9, wherein the operating state data comprises a total operating time length of the fan unit, and wherein the step of providing, through the controller, the early warning notification signal according to the operating state data further comprises:

determining, through the controller, whether the total operating time length is greater than a predetermined time length; and providing, through the controller, the early warning notification signal corresponding to the total operating time length being greater than the predetermined time length when the total operating time length is greater than the predetermined time length.

13. The monitoring method according to claim 9, wherein the operating state data comprises a driving current value configured for driving the fan unit, wherein the step of providing, through the controller, the early warning notification signal according to the operating state data further comprises:

determining, through the controller, whether the driving current value is greater than a predetermined current value; and providing, through the controller, the early warning notification signal corresponding to the driving current value being greater than the predetermined current value when the driving current value is greater than the predetermined current value.

14. The monitoring method according to claim 9, wherein the operating state data comprises an ambient temperature value, and wherein the step of providing, through the controller, the early warning notification signal according to the operating state data further comprises:

determining, through the controller, whether the ambient temperature value is greater than a predetermined temperature value; and providing, through the controller, the early warning notification signal corresponding to the ambient temperature value being greater than the predetermined temperature value when the ambient temperature value is greater than the predetermined temperature value.

15. The monitoring method according to claim 9, further comprising:

timing an operating time of the fan unit.

* * * * *